(12) United States Patent
Takahashi

(10) Patent No.: US 9,688,104 B2
(45) Date of Patent: Jun. 27, 2017

(54) PNEUMATIC TIRE

(71) Applicant: Sumitomo Rubber Industries, Ltd., Kobe-shi, Hyogo (JP)

(72) Inventor: Hiroki Takahashi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 616 days.

(21) Appl. No.: 14/102,803

(22) Filed: Dec. 11, 2013

(65) Prior Publication Data

US 2014/0158261 A1 Jun. 12, 2014

(30) Foreign Application Priority Data

Dec. 12, 2012 (JP) ................. 2012-271624

(51) Int. Cl.
*B60C 11/11* (2006.01)
*B60C 11/03* (2006.01)
*B60C 11/12* (2006.01)

(52) U.S. Cl.
CPC ........... *B60C 11/11* (2013.01); *B60C 11/0306* (2013.04); *B60C 11/1236* (2013.04); *B60C 2011/0346* (2013.04); *B60C 2011/0353* (2013.04); *B60C 2011/0355* (2013.04); *B60C 2011/1209* (2013.04)

(58) Field of Classification Search
CPC ... B60C 11/0306; B60C 11/1236; B60C 11/11
USPC ...................................... 152/209.15
See application file for complete search history.

(56) References Cited

U.S. PATENT DOCUMENTS

2011/0100520 A1* 5/2011 Shimizu .............. B60C 11/0306
152/209.18
2011/0232815 A1* 9/2011 Nakamizo ........... B60C 11/0306
152/209.18

FOREIGN PATENT DOCUMENTS

JP 2006-341769 A 12/2006

* cited by examiner

*Primary Examiner* — Timothy Kennedy
(74) *Attorney, Agent, or Firm* — Birch, Stewart, Kolasch & Birch, LLP

(57) ABSTRACT

A pneumatic tire includes a tread portion provided with three to five circumferentially extending main grooves and a plurality of lateral grooves, to form a plurality of block rows each of which includes a plurality of tread blocks. Each tread block includes a ground contact surface with a polygonal shape that has at least five sides and each interior angle of not less than 90 degrees. Each ground contact surface of the tread block includes a maximum axial width W1 positioned between its circumferentially both ends, a circumferential length L1 between its circumferentially both ends, and a ratio W1/L1 of the maximum axial width W1 to the circumferential length L1 in a range of from 0.6 to 0.9.

8 Claims, 8 Drawing Sheets

PNEUMATIC TIRE

BACKGROUND OF THE INVENTION

Field of the Invention

The present invention relates to a pneumatic tire that offers low rolling resistance while maintaining wet performance.

Description of the Related Art

A pneumatic tire having low rolling resistance is strongly requested for heavy load vehicles such as a truck or bus that consumes large amount of fuel.

It is well known that energy loss of tire rubber greatly contributes rolling resistance of the tire. Therefore, in order to improve rolling resistance of the tire, an improved rubber composition with low energy loss has been proposed. However, the improved rubber composition with low energy loss tends to have some undesirable property with respect to durability, wear resistance, and crack resistance.

In order to improve rolling resistance of the tire, Japanese Unexamined Patent Application Publication No. 2006-341769 discloses an improved tread pattern shown as in FIG. 9. The tread pattern comprises six block rows each of which includes a plurality of tread blocks "c" defined by circumferentially extending main grooves "a" and a plurality of lateral grooves "b". The central main groove "a" is configures to a zigzag groove "d" in order to offer low rolling resistance while maintaining wet performance.

However, a pneumatic tire having further improved low rolling resistance is requested in recent years.

SUMMARY OF THE INVENTION

The present invention has been worked out in light of the circumstances described above, and has a main object of providing a pneumatic tire that offers low rolling resistance while maintaining wet performance.

In accordance with the present invention, there is provided a pneumatic tire including a tread portion provided with three to five circumferentially extending main grooves and a plurality of lateral grooves, to form a plurality of block rows each of which includes a plurality of tread blocks. Each tread block includes a ground contact surface having a polygonal shape that has at least five sides and each interior angle of not less than 90 degrees. Each ground contact surface of the tread block further includes a maximum axial width W1 positioned between its circumferentially both ends, a circumferential length L1 between its circumferentially both ends, and a ratio W1/L1 of the maximum axial width W1 to the circumferential length L1 in a range of from 0.6 to 0.9.

In the first aspect of the present invention, the main grooves may be configured to zigzag grooves each of which includes a plurality of zigzag elements having an angle α in a range of from 10 to 30 degrees with respect to a circumferential direction of the tire.

In the first aspect of the present invention, each both ends of the ground contact surface of the tread block may have an axial width Wa in a range of from not less than 0.3 times but less than 1.0 times in relation to the maximum axial width W1.

In the first aspect of the present invention, each tread block may have an axially extending sipe that traverses the tread block at a circumferential center region of the tread block.

In the first aspect of the present invention, the tread blocks may include first blocks and second blocks adjacent to the first blocks through the main groove, the first blocks and second blocks may be shifted at a certain distance in a circumferential direction of the tire, and each sipe on the first blocks and each lateral grooves between the second blocks may be communicated with the main groove at the same place in the circumferential direction of the tire.

In the first aspect of the present invention, the tread portion has a ground contact patch under a standard loaded condition in which the tire is mounted on a standard rim with a standard pressure and is loaded with a standard tire load, the ground contact patch includes a front edge and a rear edge. The front edge and rear edge of the ground contact patch may have angles β of within 10 degrees with respect to the both ends of the tread block.

DETAILED DESCRIPTION

Figure 1:
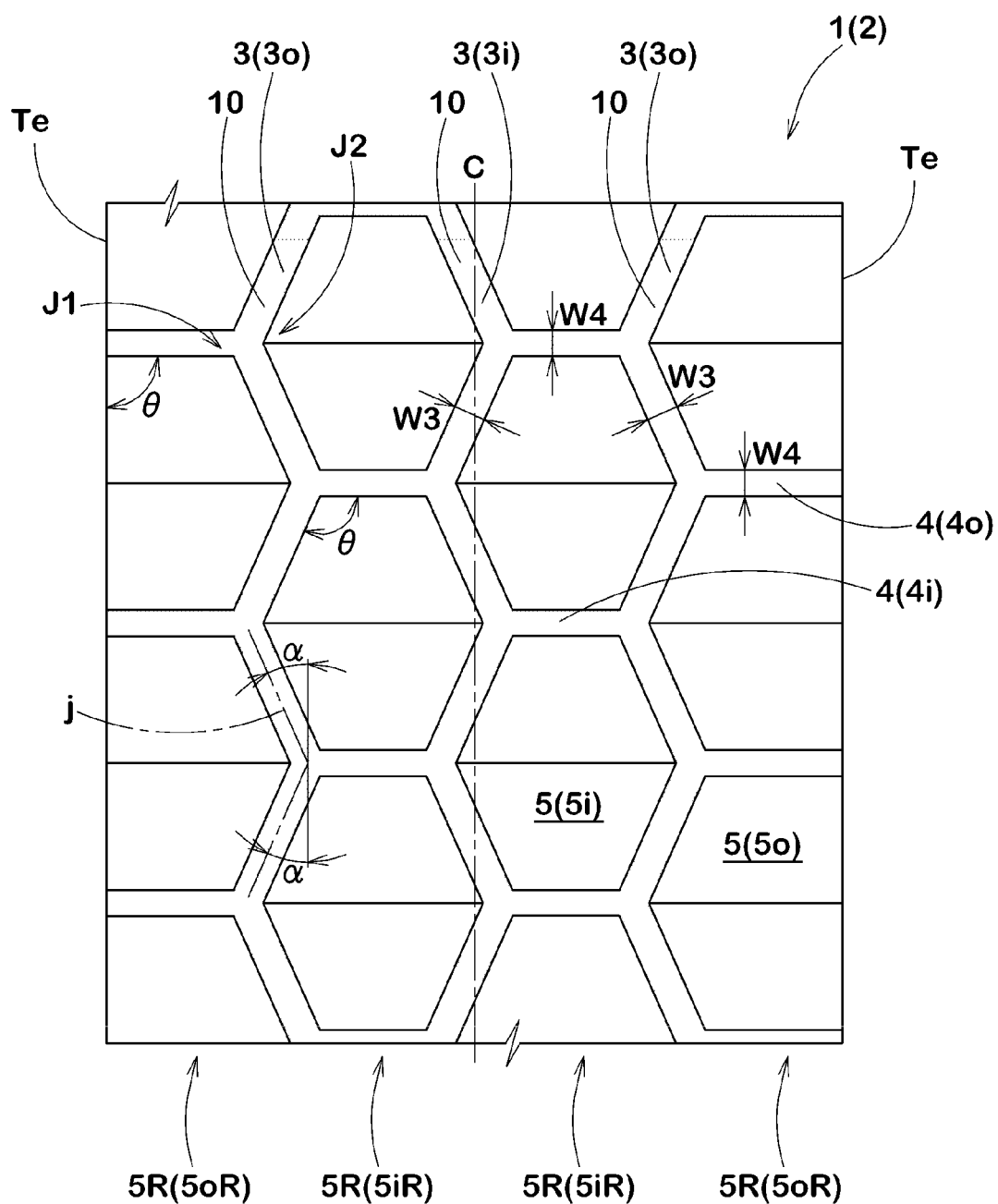
FIG. 1 is a development view of a tread portion of a pneumatic tire showing an embodiment of the present invention.

An embodiment of the present invention will be explained below with reference to the accompanying drawings. Before the present invention is described in detail, it is noted that like elements are denoted by the same reference numerals throughout the disclosure.

Referring to FIG. 1, a pneumatic tire 1 in accordance with the present invention comprises a tread portion 2 provided with three to five circumferentially extending main grooves 3 and a plurality of lateral grooves 4, to form a plurality of block rows 5R each of which includes a plurality of circumferentially arranged tread blocks 5. Preferably, the number of main grooves 3 is three to four, and three main grooves 3 are provided on the tread portion 2, in this present embodiment. The tire 1 is illustrated as a heavy duty tire for trucks or busses, in this present embodiment.

The main grooves 3 include a central main groove 3i extending on a tire equator C, and a pair of shoulder main grooves 3o disposed axially both sides the central main groove 3i.

The block rows 5R include a pair of inner block rows 5iR each of which is defined between the adjacent central main groove 3i and shoulder main grooves 3o, and a pair of outer block rows 5oR each of which is defined between the adjacent shoulder main grooves 3o and tread edge Te. The inner block row 5iR includes a plurality of circumferentially arranged inner tread blocks 5i separated by inner lateral grooves 4i. The outer block row 5oR includes a plurality of circumferentially arranged outer tread blocks 5o separated by outer lateral grooves 4o.

Figure 3:
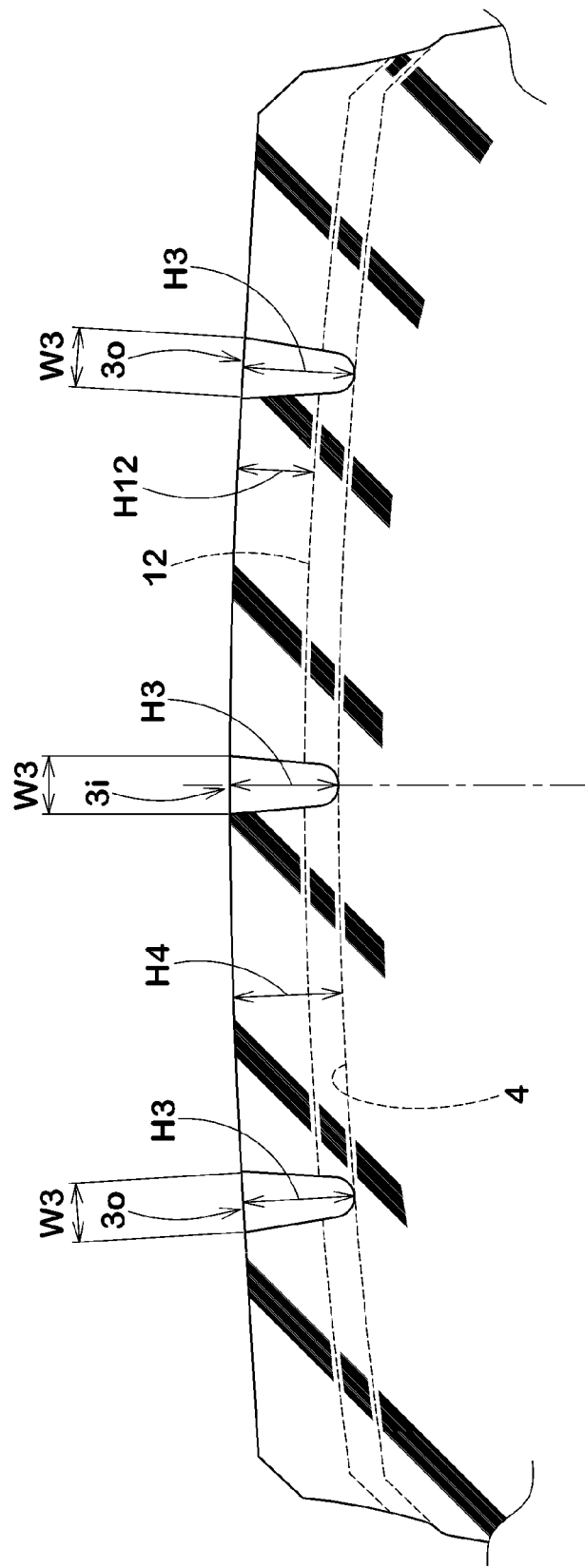
FIG. 3 is a cross sectional view of the tread portion.

Preferably, the main grooves 3 and lateral grooves 4 have groove widths W3 and W4 in a range of not less than 3 mm, more preferably not less than 4 mm, respectively. In this embodiment, the groove depth H3 of the main grooves 3 and the groove depth H4 of the lateral grooves 4 are the same, as shown in FIG. 3.

Preferably, the upper limit of groove widths W3 and W4 may be determined according to a preferable land ratio of the tread pattern. Here, the land ratio is a ratio of a net ground contact area to a gross total ground contact area on the tread portion. In order to improve both rolling resistance and wet performance of the tire, the land ratio of the tread portion 2 is preferably in a range of from 75% to 85%, and more preferably in a range of from 78% to 82%.

Figure 2A:
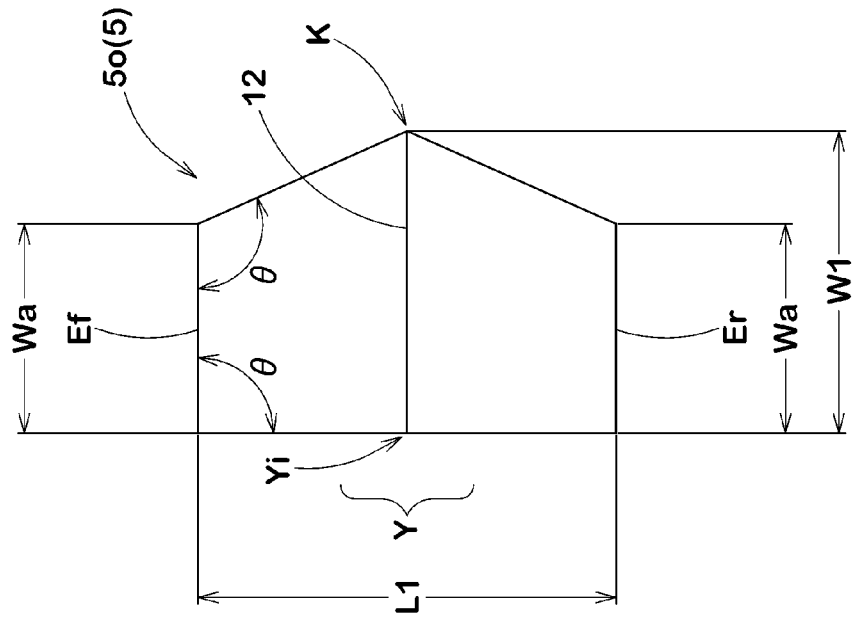
FIGS. 2A and 2B are enlarged plan views of tread blocks.
Figure 2B:
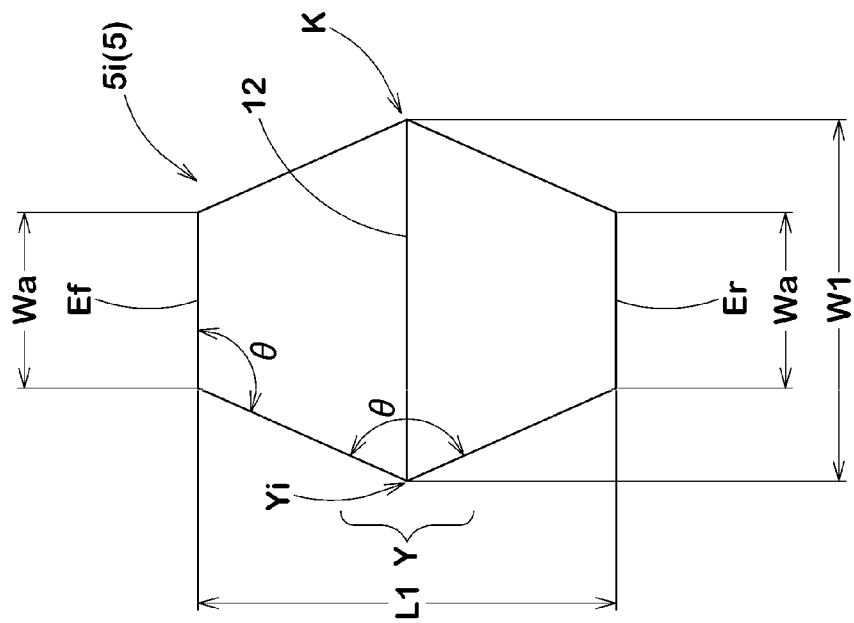

Each tread block 5 includes a ground contact surface having a polygonal shape that has at least five sides and each interior angle θ of not less than 90 degrees. As shown in FIG. 2A, the ground contact surface of inner block 5i is formed into an approximately hexagonal shape with six sides. As shown in FIG. 2A, the ground contact surface of outer block 5o is formed into an approximately pentagonal shape with five sides.

Each ground contact surface of the tread block 5 includes circumferentially both ends Ef and Er that form lateral groove edges, respectively. The tread block 5 has a maximum axial width W1 positioned between its circumferentially both ends Ef and Er, and a circumferential length L1 between circumferentially both ends Ef and Er, and a ratio W1/L1 of the maximum axial width W1 to the circumferential length L1 being in a range of from 0.6 to 0.9.

Figure 4A:
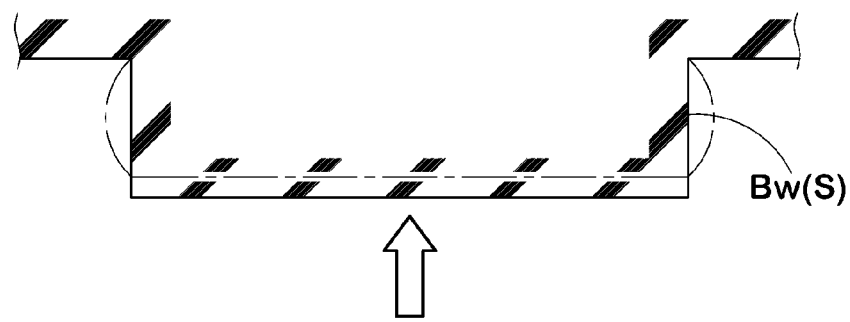
FIG. 4A is a cross sectional view of the tread block under compressive deformation state.
Figure 4B:
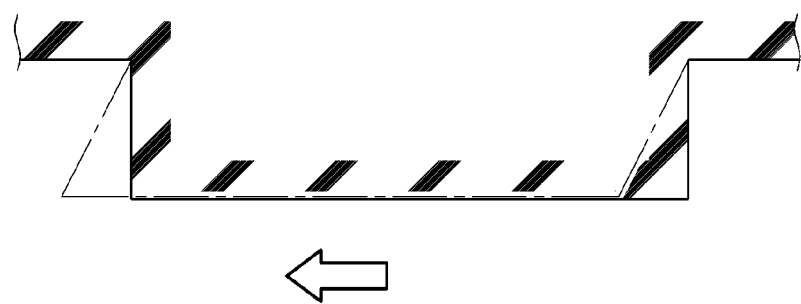
FIG. 4B is a cross sectional view of the tread block under shearing deformation state along a tire rotational direction.

The tread blocks 5 are subjected to compression and shear against the road during traveling. FIG. 4A shows a cross sectional view of the tread block under compressive deformation state, and FIG. 4B shows a cross sectional view of the tread block under shearing deformation state along a tire rotational direction. As a result of study by the present inventor, it was confirmed that the compressive deformation of tread blocks greatly contributes rolling resistance of the tire. Accordingly, it is important to reduce the compressive deformation of tread blocks for reducing rolling resistance of the tire.

Furthermore, in order to reduce the compressive deformation of tread blocks while maintaining a ground contact area, it is also important to reduce a total area ΣS of side surfaces Bw of tread blocks.

Figure 5:
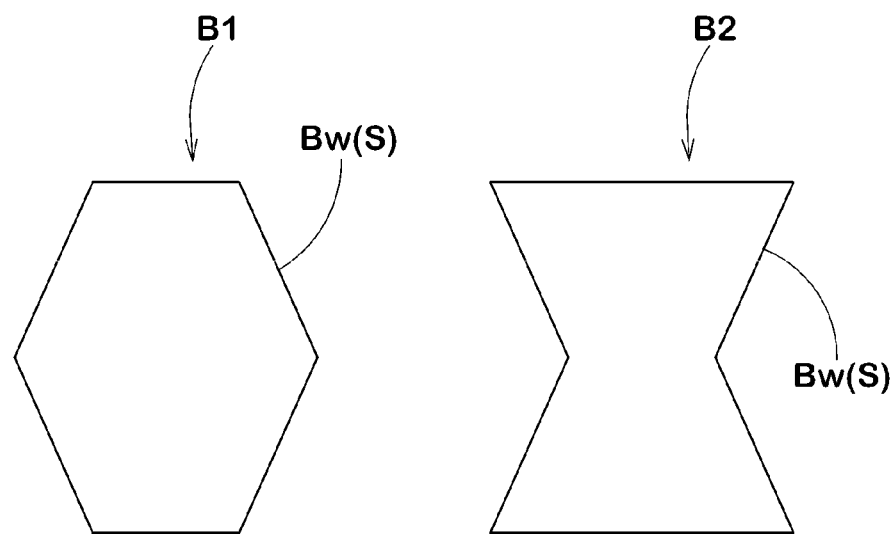
FIG. 5 is a plan view of two types of tread blocks that show different deformation on compressive deformation state.

FIG. 5 shows a plan view of two types of tread blocks B1 and B2. The tread blocks B1 and B2 have the respective same ground contact area, but the tread block B1 has less area S of its side surface Bw than that of the tread block B2. In the event that the same tire load is loaded onto both tread blocks B1 and B2, respectively, the amount of compressive deformation of the tread block B1 is less than that of the tread block B2. The present inventor experimented to study the relation between total area ΣS of side surface of whole tread blocks on a tread portion of a tire and its rolling resistance, using various kinds of test tires of 11R22.5 14PR having different tread patterns shown in FIG. 6 and Table 1. In this experiment, the total periphery edge length of tread blocks was used instead of the total area ΣS of side surface of tread blocks. Each test tire was mounted on a rim (7.50×22.5) with an internal air pressure of 750 kPa, and rolling resistance of test tires was measured at a speed of 80 km/h under a tire load of 24.52 kN, using a tester. In Table 1, the results are indicated by an index based on the sample tire No. 9 being 100. The smaller the index, the better the rolling resistance is.

TABLE 1

Figure 6E:
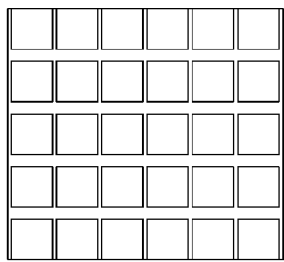
FIGS. 6A to 6I are schematic plan views of tread patterns of test tires in Table 1.
Figure 6D:
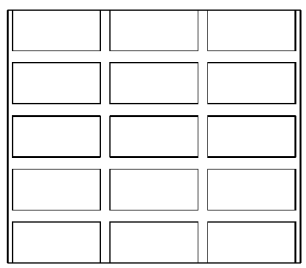
Figure 6C:
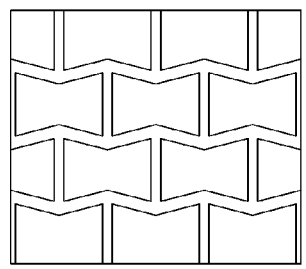
Figure 6B:
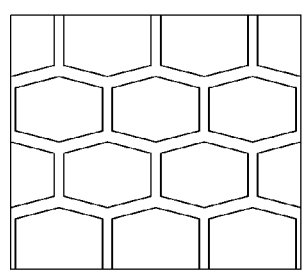
Figure 6A:
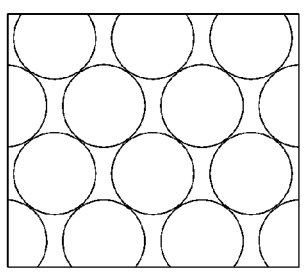
Figure 6I:
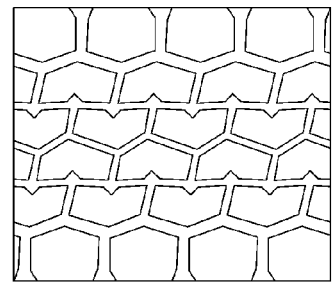
Figure 6H:
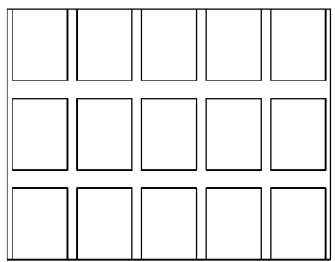
Figure 6G:
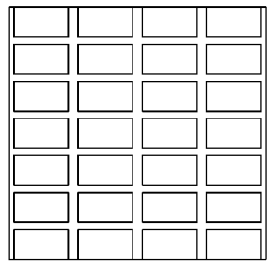
Figure 6F:
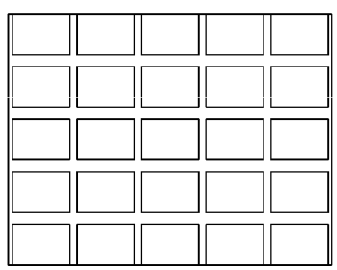

|  | Smpl. 1 | Smpl. 2 | Smpl. 3 | Smpl. 4 | Smpl. 2 | Smpl. 6 | Smpl. 7 | Smpl. 8 | Smpl. 9 |
| --- | --- | --- | --- | --- | --- | --- | --- | --- | --- |
| Tread pattern code name | P1 | P2 | P3 | P4 | P5 | P6 | P7 | P8 | P9 |
| Tread pattern | FIG. 6A | FIG. 6B | FIG. 6C | FIG. 6D | FIG. 6E | FIG. 6F | FIG. 6G | FIG. 6H | FIG. 6I |
| Land ratio (%) | 77 | 80 | 80 | 75 | 75 | 75 | 75 | 75 | 73 |
| Total area of side surface of tread blocks ΣS | 22703 | 30683 | 37151 | 36474 | 48326 | 42196 | 51732 | 32665 | 45534 |
| Rolling resistance | 52.28 | 51.11 | 52.64 | 52.42 | 52 | 52.88 | 53.4 | 52.27 | 53.2 |
| Rolling resistance index | 98.3 | 96.1 | 98.9 | 98.5 | 97.7 | 99.4 | 100.4 | 98.3 | 100 |

Figure 7:
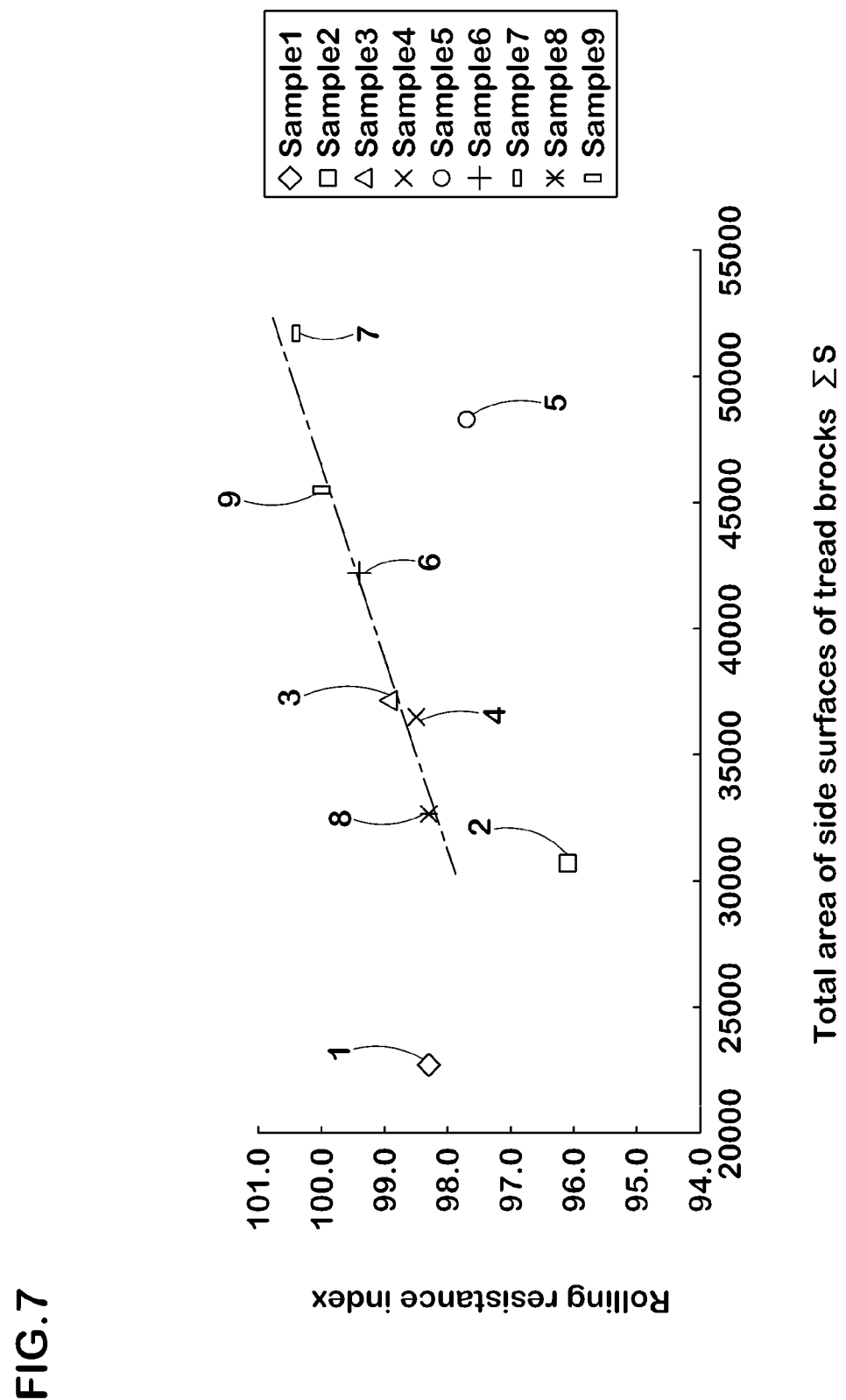
FIG. 7 is a graph showing a relation between rolling resistance and total area of side surfaces of a tread blocks.

FIG. 7 shows a graph showing the relation between rolling resistance of test tires and the total area ΣS of side surfaces of tread blocks. As shown in FIG. 7, it was confirmed that rolling resistance of a tire is reduced by lowering its total area ΣS of side surface of tread blocks.

In order to reduce total area of side surfaces of tread blocks while maintaining an area of ground contact surface of the tread blocks, a tread block having a ground contact surface with a polygonal shape that has at least five sides and each interior angle of not less than 90 degrees is preferable, wherein the ground contact surface of the tread block includes the maximum axial width W1 positioned between its circumferentially both ends Ef and Er.

In case of the sample tire No. 9 having the tread pattern P5, since its tread blocks are circumferentially adjacent through a thin lateral groove, side surfaces of tread blocks come into contact with one another when grounding. Thus, compressive deformation of tread blocks may be minimized so that rolling resistance of the tire is reduced.

In case of the sample tire No. 1 having the tread pattern P1, although its tread blocks are formed into a circular shape so that total area ΣS of side surface of tread blocks is minimized, large shearing deformation is caused on the tread blocks, whereby the advantage for reducing rolling resistance of the tire is not satisfactory.

Accordingly, in order to obtain a tire having low rolling resistance, reducing shearing deformation on tread blocks is also important. In order to reduce shearing deformation on tread blocks along the circumferential direction of the tire, the ground contact surfaces of tread blocks are preferably formed into a circumferentially long shape with large cross-sectional secondary moment along the circumferential direction of the tire having a ratio W1/L1 of the maximum axial width W1 to the circumferential length L1 in a range of from 0.6 to 0.9. Furthermore, circumferentially both ends Ef and Er of the tread block are preferably extend in straight manner to reduce shearing deformation of the tread block.

In order to provide tread blocks having satisfactory rigidity and freedom of design, the ground contact surfaces of tread blocks are preferably formed into a pentagonal or hexagonal shape.

Here, in case that the ratio W1/L1 of the tread block is more than 0.9, large shearing deformation tends to occur on the tread block. In case that the ratio W1/L1 of the tread block is less than 0.6, since the tread block tends to be a circumferentially longer shape having large total area of side surfaces of the block, large compressive deformation tends to occur on the tread block.

Preferably, each both ends Ef and Er of the ground contact surface of the tread block has an axial width Wa in a range of from not less than 0.3 times but less than 1.0 times in relation to the maximum axial width W1 of the ground contact surface, in order to reduce shearing and compressive deformation on the tread block.

The central main groove 3i and shoulder main grooves 3o are configured to zigzag grooves 10 each of which includes a plurality of zigzag elements having an angle α in a range of from 10 to 30 degrees with respect to a circumferential direction of the tire. Here, the angle α is measured using the groove centerline "j" of each main groove. These zigzag main grooves may provide tread blocks 5 with a ground contact surface having a pentagonal or hexagonal shape with ease. In case that the angle α is more than 30 degrees, the tread block tends to undergo large shearing deformation during traveling due to small width Wa of its circumferentially both ends Ef and Er. In case that the angle α is less than 10 degrees, the tread block tends to undergo large compressive deformation during traveling since total area ΣS of its side surface of tread blocks tends to be large.

Each tread block 5i and 5o has an axially extending sipe 12 that traverses the tread block at its circumferential center region Y. Here, the circumferential center region Y of the tread block 5 is a center part of three equal parts of its circumferential length L1 of the tread block 5.

The sipe 12 may improve traction on wet roads. Furthermore, since each sipe 12 has a small width, the tread blocks may maintain its high circumferential rigidity that prevents from large shearing and compressive deformation thereon. Therefore, the tire having Sipes 12 may offer low rolling resistance. In order to improve traction performance on wet roads while maintaining low rolling resistance of the tire, each sipe 12 preferably has a width in a range of from 0.5 to 3.0 mm, and a depth H12 in a range of from 0.75 to 1.0 times in relation to the groove depth H3 of the main grooves 3.

Each tread block 5i and 5o has the maximum width Wa at its center region Y. Preferably, the sipe 12 is disposed on the place of the maximum width Wa.

In this embodiment, the tread blocks 5 include a first block and a second block adjacent to the first block through the main groove 3. For instance, the first and second blocks correspond to the axially adjacent inner tread blocks 5i and 5i in a sense, respectively. In the other sense, the first and second blocks correspond to the inner and outer tread blocks 5i and 5o, respectively. These first block and second block are preferably shifted at a certain distance in the circumferential direction of the tire. Furthermore, the sipe 12 on the first block and the lateral groove 4 between to the second blocks are communicated with the main groove 3 at the same place in the circumferential direction of the tire. Namely, the sipe 12 on the first block is communicated with the main groove 3 at the place J1, and the lateral groove 4 adjacent to the second blocks is communicated with the main groove 3 at the place J2. The places J1 and J2 are substantially facing each other through the main groove 3 so that an extension of the sipe 12 crosses the place J1, or an extension of the lateral groove 4 crosses the place J2.

In this embodiment, each lateral groove 4 is communicated with a zigzag corner portion of the main groove 3. Accordingly, each place J1 where the lateral groove 4 is communicated with the main groove 3 is located at the zigzag corner portion of the main groove 3. Furthermore, each sipe 12 is communicated with the zigzag corner portion of the main groove 3. Accordingly, each place J2 where the sipe 12 is communicated with the main groove 3 is located at the zigzag corner portion of the main groove 3.

Figure 8:
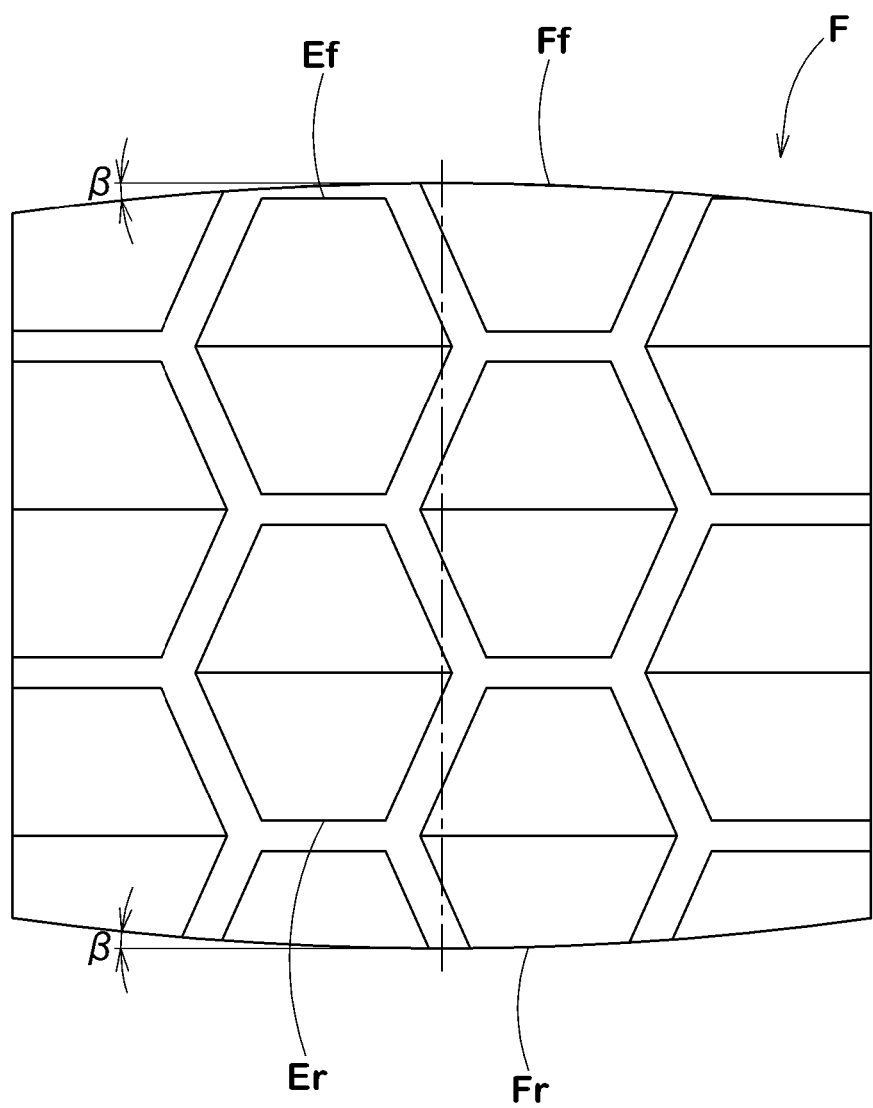
FIG. 8 is a view of a ground contact patch of the tread portion.
Figure 9:
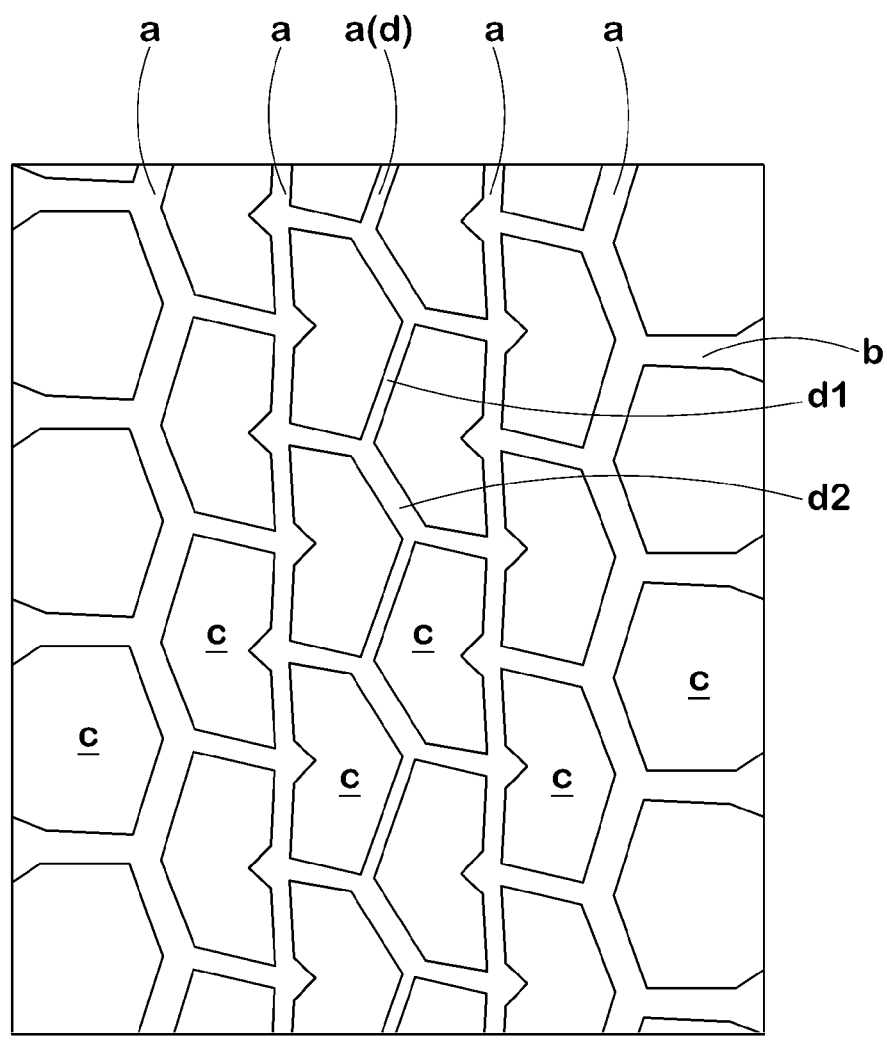
FIG. 9 is a development view of a tread pattern of a conventional tire.

FIG. 8 shows a ground contact patch F of the tread portion 2 of the tire 1 in accordance with the present embodiment. The ground contact patch F is obtained under a standard loaded condition in which the tire 1 is mounted on a standard rim with a standard pressure and is loaded with a standard tire load at a camber angle of set to zero.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

The standard tire load is the "maximum load capacity" in JATMA, the "Load Capacity" in ETRTO, and the maximum value given in the above-mentioned table in TRA or the like.

As shown in FIG. 8, the ground contact patch F includes a front edge Ff and a rear edge Fr, and the front edge Ff and rear edge Fr of the ground contact patch F preferably have angles β of within 10 degrees with respect to the both ends Ef and Er of the tread block 5, respectively. Thus, deformation of the tread block 5 is reduced so that the tire has low rolling resistance. Here, the angle β is measured at the axially center point of the lateral groove 12.

In order to further improve traction performance on wet roads, rolling resistance and steering stability of the tire, each block row preferably includes 35 to 45 tread blocks, more preferably 38 to 42 tread blocks.

The present invention is more specifically described and explained by means of the following Examples and References. It is to be understood that the present invention is not limited to these Examples and embodiments described above.

Comparison Test

Pneumatic tires having a tire size of 11R22.5 14PR shown in Table 2 were made and tested with respect to rolling resistance and wet performance. Major common specifics of tires and test method are as follows.

Details of Test Tires:
 Tread width TW: 214 mm
 Land ratio: 80%
 Main groove width W3: 6.0 mm
 Main groove depth H3: 16.6 mm
 Lateral groove width W4: 7.0 mm
 Lateral groove depth H4: 16.6 mm
 Sipe width W12: 10 mm
 Sipe depth H12: 16.6 mm Rolling Resistance:

Rolling resistance of each test tire was measured under the following condition, using a tester. The test results are indicated by an index based on Ex. 1 being 100 in Table 2. The smaller the index, the better the rolling resistance is.
Rim: 7.50×22.5
Internal pressure: 750 kPa
Tire load: 24.52 kN
Speed: 80 km Wet Road Performance:

The test tires were mounted on wheel rims of 7.50×22.5 with an inner pressure of 750 kPa, and installed in a 2-D truck with a half load to its carrying capacity 10 tons, as its whole wheels. Then, a test driver suddenly started the truck on a wet asphalt road with a puddle 5 mm deep, and measured the time for traveling to 20 m distance. The test results are indicated by an index based on Ex. 1 being 100 in Table 2. The smaller the index, the better the wet road performance is.

Test results are shown in Table 2. From the test results, it was confirmed that Example tires in accordance with the present invention can be effectively improved rolling performance while maintaining wet road performance.

each of the tread blocks including a ground contact surface having a polygonal shape which has at least five sides and of which each interior angle is not less than 90 degrees, the ground contact surface of each of the tread blocks including a maximum axial width $W1$ positioned between its both circumferential ends, a circumferential length $L1$ between the both circumferential ends, and a ratio $W1/L1$ of the maximum axial width $W1$ to the circumferential length $L1$ in a range of from 0.6 to 0.9, wherein the tread blocks comprise (i) a plurality of inner tread blocks between the central main groove and each of the shoulder main grooves and (ii) a plurality of outer tread blocks between each of the shoulder main grooves and an adjacent tread edge of the tread portion, the ground contact surface of each of the inner blocks is formed into an approximately hexagonal shape with six sides, and the ground contact surface of each of the outer blocks is formed into an approximately pentagonal shape with five sides.

TABLE 2-1

|  | Ex. 1 | Ref. 1 | Ex. 2 | Ex. 3 | Ref. 2 | Ref. 3 | Ex. 4 | Ex. 5 | Ref. 4 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| Number of main grooves | 3 | 3 | 3 | 3 | 3 | 3 | 3 | 3 | 3 |
| Zigzag angle α of main groove (deg.) | 24 | 0 | 10 | 30 | 45 | 24 | 24 | 24 | 24 |
| Inner block shape | Hexagon | Tetragon | Hexagon | Hexagon | Hexagon | Hexagon | Hexagon | Hexagon | Hexagon |
| Wa/W1 | 0.5 | 1 | 0.7 | 0.3 | 0.03 | 0.1 | 0.25 | 0.5 | 1.1 |
| W1/L1 | 0.75 | 0.53 | 0.62 | 0.82 | 1 | 0.5 | 0.6 | 0.9 | 1 |
| Outer block shape | Pentagon | Tetragon | Pentagon | Pentagon | Pentagon | Pentagon | Pentagon | Pentagon | Pentagon |
| Wa/W1 | 0.7 | 1 | 0.85 | 0.63 | 0.44 | 0.55 | 0.65 | 0.78 | 0.65 |
| W1/L1 | 0.75 | 0.64 | 0.7 | 0.79 | 0.9 | 0.5 | 0.6 | 0.9 | 0.6 |
| Sipe (s) | Presence | Presence | Presence | Presence | Presence | Presence | Presence | Presence | Presence |
| Angle b (deg.) | 5 | 5 | 5 | 5 | 5 | 5 | 5 | 5 | 5 |
| Rolling resistance (Index) | 100 | 120 | 105 | 105 | 110 | 115 | 108 | 106 | 115 |
| Wet road performance (Index) | 100 | 120 | 110 | 105 | 95 | 105 | 95 | 110 | 90 |

TABLE 2-2

|  | Ex. 6 | Ex. 7 | Ex. 8 | Ref. 5 | Ref. 6 | Ref. 7 | Ex. 9 |
|---|---|---|---|---|---|---|---|
| Tread pattern | FIG. 1 | FIG. 1 | FIG. 1 | FIG. 6A | FIG. 6C | FIG. 6I | FIG. 1 |
| Number of main grooves | 3 | 3 | 3 | 3 | 3 | 5 | 5 |
| Zigzag angle α of main groove (deg.) | 24 | 24 | 24 | — | 24 | — | 24 |
| Inner block shape | Hexagon | Hexagon | Hexagon | Circle | Hexagon | — | Hexagon |
| Wa/W1 | 0.5 | 0.5 | 0.5 | — | 1 | — | 0.34 |
| W1/L1 | 0.75 | 0.75 | 0.75 | 1 | 0.75 | — | 0.75 |
| Outer block shape | Pentagon | Pentagon | Pentagon | Circle | Pentagon | — | Pentagon |
| Wa/W1 | 0.7 | 0.7 | 0.7 | — | 1 | — | 0.6 |
| W1/L1 | 0.75 | 0.75 | 0.75 | 1 | 0.75 | — | 0.75 |
| Sipe (s) | Absence | Presence | Presence | Presence | Presence | Absence | Presence |
| Angle b (deg.) | 5 | 0 | 10 | 5 | 5 | 5 | 5 |
| Rolling resistance (Index) | 100 | 98 | 108 | 110 | 115 | 120 | 100 |
| Wet road performance (Index) | 110 | 100 | 100 | 105 | 100 | 100 | 95 |

What is claimed is:

1. A pneumatic tire comprising:
a tread portion provided with a plurality of circumferentially extending main grooves, wherein the main grooves consist of a central main groove extending on a tire equator and a pair of shoulder main grooves disposed one on each side of the central main groove, and a plurality of lateral grooves, to form a plurality of block rows each of which includes a plurality of tread blocks, the three main grooves having a same width, 2. The tire according to claim 1, wherein the main grooves are zigzag grooves, each of which includes a plurality of zigzag elements having an angle α in a range of from 10 to 30 degrees with respect to a circumferential direction of the tire.

3. The tire according to claim 1, wherein the both circumferential ends of the ground contact surface of each of the tread blocks has an axial width Wa in a range of from not less than 0.3 times but less than 1.0 times in relation to the maximum axial width $W1$.

4. The tire according to claim 1, wherein each of the tread blocks has an axially extending sipe that traverses the tread block at a circumferential center region of the tread block.

5. The tire according to claim 4,
wherein the tread blocks include first blocks and second blocks adjacent to the first blocks through each of the main grooves, the first blocks are shifted in the tire circumferential direction from the second blocks by a certain distance, and the sipes on the first blocks are communicated with each of the main grooves, and the lateral grooves between the second blocks are communicated with the main groove at the same positions in the circumferential direction of the tire as the sipes on the first blocks.

6. The tire according to claim 1, wherein
the tread portion has a ground contact patch under a standard loaded condition in which the tire is mounted on a standard rim with a standard pressure and is loaded with a standard tire load, the ground contact patch includes a front edge and a rear edge, and the front edge and the rear edge of the ground contact patch have angles $\beta$ of not more than 10 degrees with respect to the both ends of each of the tread blocks.

7. The tire according to claim 1, wherein each of the inner tread blocks is provided with an axially extending sipe, and each of the outer tread blocks is provided with an axially extending sipe.

8. The tire according to claim 1, wherein the ratio $W1/L1$ is in a range of from 0.75 to 0.9.

\* \* \* \* \*